(No Model.)
F. MARBURG, Jr.
COUPLING FOR ELECTROMOTORS.
No. 547,930. Patented Oct. 15, 1895.
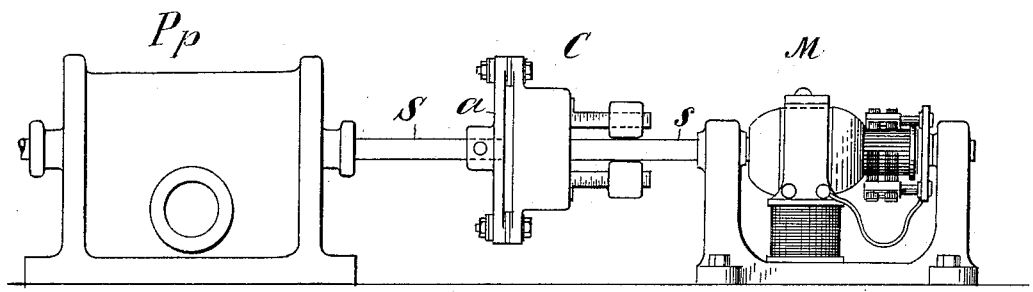
FIG:1.
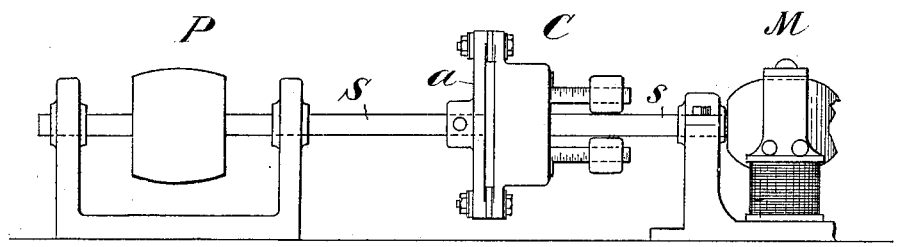
FIG:2.
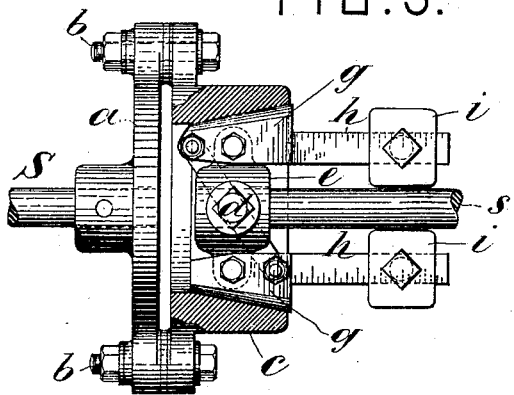
FIG:3.
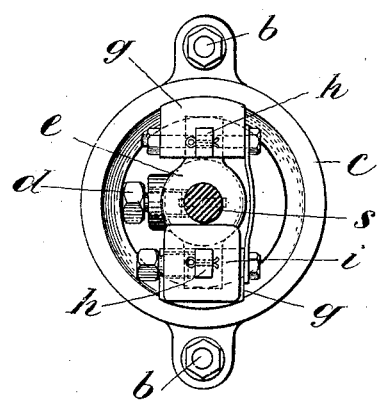
FIG:4.
WITNESSES:
INVENTOR:
Franz Marburg Jr.
By Henry Connett
Attorney.

UNITED STATES PATENT OFFICE.

FRANZ MARBURG, JR., OF BUFFALO, NEW YORK.

COUPLING FOR ELECTROMOTORS.

SPECIFICATION forming part of Letters Patent No. 547,930, dated October 15, 1895.

Application filed May 14, 1895. Serial No. 549,254. (No model.)

*To all whom it may concern:*

Be it known that I, FRANZ MARBURG, Jr., a subject of the Emperor of Germany, residing at Buffalo, in the county of Erie and State of New York, have invented certain new and useful Improvements in Couplings for Electromotors, of which the following is a specification.

My invention relates to a clutch for coupling an electromotor to the shaft of a machine to be driven thereby or to any power-shaft; and the object of the invention is to enable the motor to get well under way before it is coupled to its load; to provide means for accurately regulating the operation of coupling, so that it will take effect when a predetermined speed is reached, and to provide for the gradual and automatic application of the coupling-friction as the speed of the motor increases.

The invention will be fully described hereinafter and its novel features carefully defined in the claims.

In the accompanying drawings I have illustrated an embodiment of my invention.

Figure 1 is a side elevation showing an electromotor coupled to a rotary pump by my coupling-clutch, and Fig. 2 is a similar view showing the clutch employed for coupling the motor to a power-shaft. Fig. 3 is a side elevation partly in section, and Fig. 4 is an end elevation of the clutch on a larger scale than Figs. 1 and 2. Only the female member of the clutch is in section in Fig. 3.

In the general views, M represents an electromotor of any approved pattern.

P *p* in Fig. 1 represent a rotary pump, and P in Fig. 2 represents a pulley, from which any kind of mechanism may be driven by a belt.

S represents the main shaft to be driven by the motor M, and *s* the armature-shaft of the motor.

C represents the coupling-clutch as a whole, the details of which are seen in Figs. 3 and 4.

Figs. 1 and 2 show the parts somewhat diagrammatically and do not represent the parts in accurate proportion, the object being, mainly, to illustrate the application of the invention in these views.

One member of the coupling-clutch is carried by the main shaft S and the other member by the armature-shaft *s*. As here shown, the hollow or female member is carried by the main shaft. On this latter shaft is secured a disk or head *a*, to which is secured, by bolts *b*, the ring-like coned female member *c*. On the shaft *s* is secured, by a screw *d*, a head *e*, furnished with ears or lugs, on which are pivotally mounted the two friction-jaws *g*, turned to a cone form, so as to fit within the hollow cone of the member *e*. These jaws have each an arm *h*, bearing an adjustable weight *i*, the arms bearing graduation marks, as shown, whereby the weights may be accurately adjusted on them. The jaws are made to fit within the member *c* normally, but not tightly or frictionally, and are so mounted on the head *e* that when the weights *i* are thrown outward by the centrifugal force, due to rotation of the armature-shaft *s*, the outer convex faces of the jaws are brought forcibly into frictional contact with the concave inner surface of the member *c*, the pressure being measured by the centrifugal force to which the weights *i* are subjected and the leverage due to their positions on the arms *h*. As these are carefully graduated, the weights may be so set as to proportion the frictional driving-pressure very exactly to the speed of the motor. This is very important when the rotary pump to be driven operates against a certain pressure and is to run at a certain speed.

The clutch shown is very advantageous for coupling the shaft of an electromotor to a pump or other shaft, as it permits the motor to start easy, and thus prevents the burning out of the wires.

Having thus described my invention, I claim—

1. The combination with an electromotor and a main shaft to be driven thereby, of a friction clutch which couples said shaft and that of the motor, said clutch being adapted to operate through centrifugal force generated by the rotation of the armature shaft of the motor, and provided with means for proportioning said force to the speed of said shaft substantially as set forth.

2. The combination with an electromotor and a main shaft to be driven thereby, of a coupling clutch C, one member of which is carried by said main shaft and the other member by the armature shaft of the motor, the male member of the clutch comprising the two jaws $g$, having graduated arms $h$, and adjustable weights $i$ thereon, substantially as and for the purposes set forth.

3. The centrifugal friction clutch comprising the female member $c$, the head $e$, the jaws $g$, pivotally mounted on the head within the member $c$, the arms $h$ on said jaws, provided with graduation marks, and the weights $i$, mounted adjustably on said arms, substantially as set forth.

In witness whereof I have hereunto signed my name in the presence of two subscribing witnesses.

FRANZ MARBURG, JR.

Witnesses:
WALTER W. SCOTT,
WILLIAM J. BLAKE.